3,017,286
METHOD FOR COATING GRAPHITE WITH NIOBIUM CARBIDE
James S. Kane and John H. Carpenter, Livermore, and Oscar H. Krikorian, Danville, Calif., assignors to the United States of America as represented by the United States Atomic Energy Commission
No Drawing. Filed Sept. 8, 1958, Ser. No. 759,830
5 Claims. (Cl. 117—22)

This invention relates in general to a method for coating graphite surfaces with niobium carbide and, in particular, to such a method utilizing the unique surface wetting properties of molten niobium metal to bond and provide a coating on graphite surfaces.

In the present age of nuclear reactors, high speed missiles and jet or rocket propulsion engines and many other technological fields there are ever increasing needs for refractory structures and surfaces which are stable and retain strength at much higher operating temperatures than heretofore employed and often in the presence of oxidizing or reducing atmospheres, ionizing radiation, high pressures or vacuums, and other severe and unusual conditions which ordinary materials of construction will not withstand. Graphitic carbon is a material which admirably satisfies many of the necessary requirements in this field. Graphite possesses highly desirable properties including low density, high melting or sublimation point and high structural strength at higher temperatures, permitting its use where most other structural materials, including common metals, are not satisfactory. In addition, graphite has a low neutron absorption cross-section while possessing adequate moderating capacity required in nuclear reactors and associated systems.

However, the normal properties of graphite are inadequate in certain respects and in particular environments. Graphite erodes and corrodes at high gas pressures, velocities and temperatures. Many gases and other materials react with graphite or are absorbed in an undesirable manner in certain environments. To alleviate this difficulty, in nuclear reactors, for example, graphite moderator blocks have been contained with a non-reactive metal such as zirconium or aluminum to prevent adsorption of or reaction with the coolant. However, in gas cooled reactors and especially in mobile, lightweight compact reactors having single piece graphite cores, this form of construction is disadvantageous due to bulk, low structural strength and other factors.

Niobium metal has now been discovered to possess unique and remarkable wetting and bonding properties which may be utilized in accordance with certain procedures to provide graphite surfaces with a highly tenacious, integrally bonded refractory coating. In accordance with the invention, the niobium is disposed in contact with the graphite and the assemblage is outgassed by heating in a vacuum. Thenceforth in a critical heating operation the assemblage or at least the metal-graphite contact area is raised rapidly to a temperature above the melting point of the metal whereupon the remarkable wetting property is developed and the metal immediately wets and spreads rapidly over a wide area of the graphite surfaces to form a bonded layer. The rapid heating is essential since with slow heating carburization of the metal occurs before the metal is molten and a poorly adherent flaky deposit is formed. Subsequent to wetting of the surface continued heating serves to carburize the metal to form an adherent coating, or other treatments may be employed to apply or deposit additional layers of carbide on the bonded surface. Using a material such as niobium which has excellent physical and nuclear properties for nuclear reactors, excellent coated moderator or uranium impregnated graphite moderator reactor cores or fuel elements may be provided which are satisfactory for use in severest service such as in gas cooled and liquid metal cooled reactors or nuclear rocket engines. Manifold other graphite articles may be coated likewise in order to improve chemical resistance or the like, e.g., crucibles, electrodes, furnace linings, etc.

Accordingly, it is an object of the invention to provide a method for producing adherent refractory coatings on graphite surfaces.

A further object of the invention is to provide refractory carbide coated graphite structures for use in high temperature erosive and corrosive environments.

Another object of the invention is to provide a method for bonding niobium to a graphite surface.

A still further object of the invention is to provide a method wherein molten niobium is caused to wet a graphite surface to produce a bonding layer which is later converted into an adherent carbide coating.

Still another object of the invention is to provide a bonded coating on graphite by outgassing niobium in contact with the graphite surface by heating while under a vacuum, and then heating very rapidly to a temperature above the melting point whereupon the metal melts and immediately wets and adheres to said surface.

Other objects and advantages of the invention will become apparent upon consideration of the following description.

The graphite structures or surfaces to be coated are fabricated in accordance with conventional practices. For example reactor components may be machined graphite of the usual reactor grades. In certain gas cooled reactors, uranium impregnated graphite cores having a multitude of gas coolant passages or channels are employed. A coolant or exhaust gas such as $H_2$, $CH_4$, $NH_3$, or $N_2$ is passed through the channel while the reactor core is operating and is thereby heated to a highly elevated temperature.

In order to provide a protective coating to such graphite structure in accordance with the invention niobium metal, preferably in finely divided form, is disposed in a thin layer in contact with the surface to be coated. No particular care is required to obtain uniform or total coverage since the remarkable wetting properties of the applied niobium metal developed in subsequent operation assure complete coverage extending to a considerable distance from a local deposition resulting in penetration and spreading of the metal into pores, depressions and perforations or over projections. The graphite and metal are then degassed under vacuum at a temperature approaching the metallic melting point to remove chemisorbed gases which would interfere with the wetting action between the subsequently melted metal and the graphite. Satisfactory results have been obtained with temperatures of 1400° C. and vacuums of $10^{-3}$ mm. Hg. Under vacuum conditions, the temperature is then quickly raised to about 2500° C. or higher, causing the metal to rapidly melt, spread and wet the graphite surface with some penetration. Coatings of the niobium metal alone, or predominantly of metal, are produced by reducing the temperature immediately after wetting is effected. By maintaining the elevated temperature, the niobium metal is converted to the carbide. The time-temperature sequence is especially critical since the wetting must take place before carburization interrupts the wetting action.

More specifically, porous and dense graphites having any shape or comprising any commercial or reactor grade material provided by a conventional process are suitable for treatment in accordance with the invention. For example, the graphite may be in the form of a block, tube, nozzle, bored nuclear reactor core, etc. Reactor grade graphite generally contains less than 3 p.p.m. boron and similarly limited amounts of other undesirable substances. The graphite should be reasonably free from surface contamination and flaws which might interfere with the coating procedure. In practice the graphite shape is disposed within an induction type furnace in such a position that the surface to be coated is horizontal or nearly horizontal. Such positioning is necessary for initially contacting the niobium metal with the graphite as hereinafter described. If the shape is highly irregular several separate applications at different positions may be necessary to achieve the horizontal contactings; however, because of the surface, molecular and other forces acting between the molten metal and a given graphite surface, the molten niobium metal will under the conditions set forth hereinafter creep up vertical walls for a distance of the order of one inch, and perhaps further, thereby facilitating coating procedures on surfaces having substantial irregularities. The niobium metal is distributed in contact with the graphite surface in the form of metal powder, wire, strip or any other satisfactory shape. Although the niobium has excellent wetting characteristics, as a practical matter it should be disposed to spread not more than an inch from the point of disposition, in order to achieve wetting with the time limitations as indicated above. The niobium used need not be of any particular purity, but in general should be as free as possible of impurities for best results or to satisfy requirements of the finished product. Fractional percentages of metals, oxides, carbides and other materials can be tolerated.

The entire assembly is subjected to heat and vacuum sufficient to degas both the metal and the graphite. A temperature of 1400–1500° C. has been found satisfactory for this step although a lower temperature with longer pumping times would also eliminate the adsorbed gases to a lesser extent. The upper temperature is limited by the point at which the solid metal tends to carburize in place. Neither the pumping speed nor the intermediate vacuum pressure maintained are critical although higher pumping speeds and lower pressures appear to enhance the wetting action. In practice, vacuum pressures of $10^{-3}$ to $10^{-4}$ mm. Hg have been found satisfactory and pumping is continued until such constant pressure is attained, usually after some 15–20 minutes. Chemisorption onto refractory metals is well known in the art to interfere with the metal wetting and bonding properties, as well as that of graphite, and hence this step must be observed with all materials that have been exposed to a foreign atmosphere. After degassing, the vacuum pumping is continued to remove any possibility of gases leaking into the system during the firing step and to remove gases evolved at higher temperatures.

Subsequent to degassing the temperature of the furnace is raised as quickly as possible to a temperature of the order of 2500° C. or higher in a critical heating sequence. Although the temperature is in itself important, poorer results being obtained at lower temperatures, the speed with which the temperature is raised to this point is even more critical. By raising the temperature very quickly the metal melts and spreads over the adjoining area before being carburized, i.e., before reacting with the graphite to form the carbide. At lower temperatures or at lower heating rates the metal is carburized directly from its solid form, or else it only incompletely spreads and penetrates the graphite, resulting in a spotty, poorly adhesive coat. While the exact maximum heating rate-time varies somewhat with different structures, it has been found that by raising the temperature of the furnace to 2500° C. in 15 minutes or less the desired results are produced. At the end of 20 minutes at the same temperature carburization is complete. The temperature during wetting need only be maintained at a point above the melting point of the metal and thereafter the temperature may be lowered to a lower value as soon as wetting is effected to complete the carburization if desired.

The resulting niobium coating has a shiny metallic luster, is impervious to sharp instruments and adheres tenaciously to the graphite. Once formed the niobium carbide does not itself creep, and has a melting point of above 3000° C.

Further details of the invention will be set forth in the following specific description of the operation of the process.

*Example*

A number of holes, each one-quarter inch in diameter, were drilled to a depth of three-quarters of an inch in cylindrical specimens of National Carbon Division, Union Carbide and Carbon Corporation AGX graphite. One-half to one gram of powdered niobium, 200 mesh, was placed in each of the holes. The niobium was 99.9% pure, containing only traces of other metals, but having a small amount of oxides, carbides and other non-metallic impurities. The graphite block was placed in a graphite crucible surrounded by graphite powder insulation. The assembly was contained in a Pyrex thimble in which a vacuum of between $10^{-3}$ and $10^{-4}$ mm. Hg was maintained with a fast pumping rate (50 l./sec.) during the remaining steps. The thimble was surrounded by an induction coil for heating purposes.

The sample and crucible were heated to a temperature slightly below 1500° C. for 15–20 minutes. This was sufficient to reduce the evolved chemi-sorbed gases to a constant pressure. The sample was then heated to a temperature of 2600° C. in less than 15 minutes and retained at this temperature until carburization was complete. In a series of similar experiments the same result was attained at temperatures in the range of 2500° C. The metal sample was entirely converted to the carbide, as shown by X-ray examination. Although the metal had been placed only in the bottom of the holes at the beginning of the experiment, the melt had entirely covered the surface of the bores and about a quarter to half an inch around the orifice at the top.

While the invention has been disclosed with respect to several preferred embodiments, it will be apparent to those skilled in the art that numerous variations and modifications may be made within the spirit and scope of the invention and thus it is not intended to limit the invention except as defined in the following claims.

What is claimed is:

1. In a process for reacting graphite with finely divided niobium metal to produce a solid metal carbide coating comprising the steps of contacting niobium metal powders randomly with a quantity of graphite, said quantity being sufficient to cover the graphite surface upon melting and spreading, said distance between said particles not exceeding one inch, degassing said metal and said graphite surfaces by applying a vacuum pressure lower than about $10^{-3}$ mm. Hg thereto while heating said metal and graphite to a temperature of at least 1400° C. for a period of at least ten minutes, further heating said metal and said graphite to a temperature of above about 2500° C. within a period of about 15 minutes while continuing to pump thereon at a pumping rate in the range of about 50 liters per second per square inch of graphite surface, said vacuum pressure being maintained between $10^{-3}$ and $10^{-4}$ mm. Hg, whereby said niobium powders melt, flow and wet said graphite surfaces, and continuing to heat said graphite-niobium combination until carburization takes place.

2. The process of claim 1 in which said finely divided niobium metal is contacted along a vertical graphite surface, whereby said metal upon melting flows along and up said vertical surface and wets said graphite thereon during said melting step.

3. The process of claim 1 in which the particle size of said finely divided niobium metal is at least 200 mesh.

4. The process of claim 1 in which said temperature is not permitted to rise above about 2600° C. during said heating steps.

5. The process of claim 1 in which said finely divided niobium metal is contacted along a horizontal graphite surface.

References Cited in the file of this patent

UNITED STATES PATENTS

| | | |
|---|---|---|
| 912,245 | Kuzel | Feb. 9, 1909 |
| 2,030,695 | Erber | Feb. 11, 1936 |
| 2,532,295 | Gardner | Dec. 5, 1950 |
| 2,548,897 | Kroll | Apr. 17, 1951 |
| 2,597,964 | Winter | May 27, 1952 |
| 2,929,741 | Steinberg | Mar. 22, 1960 |

OTHER REFERENCES

The Reactor Handbook (AECD-3647), vol. 3, published by USAEC (1955); pages 151–152.

Cotter: Atomics (September 1957), pages 339–342.